(12) United States Patent
Horio (10) Patent No.: US 9,405,040 B2
(45) Date of Patent: Aug. 2, 2016

(54) OPTICAL LAYERED BODY, METHOD OF PRODUCING THE SAME, POLARIZER AND IMAGE DISPLAY DEVICE

(75) Inventor: Tomoyuki Horio, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 831 days.

(21) Appl. No.: 12/553,271

(22) Filed: Sep. 3, 2009

(65) Prior Publication Data

US 2010/0167068 A1    Jul. 1, 2010

(30) Foreign Application Priority Data

Sep. 4, 2008  (JP) ................. 2008-227192

(51) Int. Cl.
*B32B 9/04* (2006.01)
*B05D 5/06* (2006.01)
*G02B 1/04* (2006.01)
*G02B 5/30* (2006.01)

(52) U.S. Cl.
CPC ............... *G02B 1/04* (2013.01); *G02B 5/3041* (2013.01)

(58) Field of Classification Search
USPC ................. 428/448, 452; 427/163.1; 977/773
See application file for complete search history.

(56) References Cited

U.S. PATENT DOCUMENTS

| 6,064,524 A * | 5/2000 | Oka et al. ................ 359/582 |
| 2002/0018886 A1* | 2/2002 | Matsufuji et al. ............ 428/328 |
| 2002/0142151 A1* | 10/2002 | Ochiai et al. ................ 428/328 |
| 2005/0020758 A1* | 1/2005 | Terry ........................... 524/492 |
| 2005/0261389 A1* | 11/2005 | Bratolavsky et al. ........... 522/71 |
| 2006/0269733 A1* | 11/2006 | Mizuno et al. .............. 428/304.4 |
| 2007/0298193 A1* | 12/2007 | Nakamura et al. ............ 428/1.33 |

FOREIGN PATENT DOCUMENTS

| JP | 2001-278924 A | 10/2001 |
| JP | 2003-131007 A | 5/2003 |
| JP | 2003-205563 A | 7/2003 |
| JP | 2004-182765 A | 7/2004 |
| JP | 2005-041205 A | 2/2005 |
| JP | 2005-186435 A | 7/2005 |
| JP | 2006-337852 A | 12/2006 |
| JP | 2007-292883 A | 11/2007 |
| JP | 2008-019414 A | 1/2008 |
| JP | 2008-121011 A | 5/2008 |
| JP | 2008-133352 A | 6/2008 |

* cited by examiner

*Primary Examiner* — Tahseen N Khan
(74) *Attorney, Agent, or Firm* — Hamre, Schumann, Mueller & Larson, P.C.

(57) ABSTRACT

An optical layered body, which has a high hardness and a fine external appearance without an interference fringe, and is excellent in optical properties and in an adhesion property between a substrate and a hard coat layer. An optical layered body includes a light-transmitting substrate; and a hard coat layer, wherein the light-transmitting substrate is made of triacetyl cellulose, the hard coat layer is a resin layer formed with a composition for forming a hard coat layer containing colloidal silica, a solvent, and pentaerythritol tri(meth)acrylate and/or dipentaerythritol hexa(meth)acrylate, an amount of the pentaerythritol tri(meth)acrylate and/or dipentaerythritol hexa(meth)acrylate is 25% by mass or more in 100% by mass of a resin solid content in the composition for forming a hard coat layer, an amount of the colloidal silica is 30 to 70% by mass in 100% by mass of a total of the colloidal silica and the resin solid content in the composition for forming a hard coat layer, and the solvent consists of solvents impermeable to the light-transmitting substrate.

10 Claims, 1 Drawing Sheet

US 9,405,040 B2

OPTICAL LAYERED BODY, METHOD OF PRODUCING THE SAME, POLARIZER AND IMAGE DISPLAY DEVICE

This application claims priority from Japanese Application 2008-227192, filed Sep. 4, 2008.

TECHNICAL FIELD

The present invention relates to an optical layered body, a method of producing an optical layered body, a polarizer, and an image display device.

BACKGROUND ART

An optical layered body, which comprises functional layers having various properties such as an antireflection property, an antistatic property, a hard coating property, and an antifouling property, is provided in an image display device such as a cathode-ray tube (CRT) display device, a liquid crystal display (LCD), a plasma display (PDP), an electroluminescence display (ELD), and a field emission display (FED).

The optical layered body has various functional layers formed on a transparent substrate. Accordingly, when a hard coating is formed on a transparent substrate, there has been a case where reflected light on the surface of the transparent substrate interferes with reflected light on the surface of the hard coat layer. As a result, there has been a problem that an interference fringe due to the uneven thickness of the layers appears and the external appearance of the optical layered body is damaged.

In order to prevent the appearance of such an interference fringe, a method is known in which a solvent permeable to a transparent substrate to swell or dissolve the substrate is used in a resin composition for forming a hard coat layer, when the hard coat layer is formed on the transparent substrate (Patent Documents 1 and 2). Use of the resin composition containing such a solvent substantially avoids the interface between the transparent substrate and the hard coat layer, so that an appearance of an interference fringe is prevented.

However, a higher-quality optical layered body has been wanted according to the improvement in quality of recent image display devices. Accordingly, it is demanded to more strictly inhibit the interference fringe, compared to the above method.

Patent Document 1: JP-A 2003-131007
Patent Document 2: JP-A 2003-205563

SUMMARY OF THE INVENTION

In view of the above-mentioned state of the art, it is an object of the present invention to provide an optical layered body, which has a high hardness and a fine external appearance without an interference fringe, and is excellent in optical properties and an adhesion property between a substrate and a hard coat layer.

The present invention provides an optical layered body, including: a light-transmitting substrate; and a hard coat layer, wherein the light-transmitting substrate is made of triacetyl cellulose, the hard coat layer is a resin layer formed with a composition for forming a hard coat layer containing colloidal silica, a solvent, and pentaerythritol tri(meth)acrylate and/or dipentaerythritol hexa(meth)acrylate, an amount of the pentaerythritol tri(meth)acrylate and/or dipentaerythritol hexa (meth)acrylate is 25% by mass or more in 100% by mass of a resin solid content in the composition for forming a hard coat layer, an amount of the colloidal silica is 30 to 70% by mass in 100% by mass of the total of the colloidal silica and the resin solid content in the composition for forming a hard coat layer, and the solvent consists of solvents impermeable to the light-transmitting substrate.

In the optical layered body of the present invention, the amount of the pentaerythritol tri(meth)acrylate and/or dipentaerythritol hexa(meth)acrylate is desirably 60 to 100% by mass in 100% by mass of the resin solid content in the composition for forming a hard coat layer.

The colloidal silica is desirably surface-treated colloidal silica.

The surface-treated colloidal silica desirably has a ultraviolet reactive functional group on the surface.

The amount of the colloidal silica is desirably 35 to 60% by mass in 100% by mass of the total of the colloidal silica and the resin solid content in the composition for forming a hard coat layer.

The colloidal silica in the composition for forming a hard coat layer is desirably in a spherical particulate shape and/or a non-spherical particulate shape.

The solvent impermeable to the light-transmitting substrate is desirably at least one solvent selected from the group consisting of methanol, ethanol, propanol, butanol, propylene glycol monomethyl ether, and methylisobutyl ketone.

In the optical layered body of the present invention, the hard coat layer desirably further contains at least one agent selected from the group consisting of an antistatic agent, an antifouling agent, and an antiglare agent.

In the optical layered body of the present invention, on the face opposite to the light-transmitting substrate of the hard coat layer is further provided at least one layer selected from the group consisting of an antistatic layer, a low refractive index layer, a high refractive index layer, a middle refractive index layer, an antifouling layer, an antiglare layer, a second hard coat layer of the same type as the hard coat layer, and an other hard coat layer of a type different from the hard coat layer.

The present invention further provides a method of producing an optical layered body including the step of applying a composition for forming a hard coat layer on a light-transmitting substrate so as to form a hard coat layer, wherein the light-transmitting substrate is made of triacetyl cellulose, the composition for forming a hard coat layer contains colloidal silica, a solvent, and pentaerythritol tri(meth)acrylate and/or dipentaerythritol hexa(meth)acrylate, an amount of the pentaerythritol tri(meth)acrylate and/or dipentaerythritol hexa (meth)acrylate is 25% by mass or more in 100% by mass of a resin solid content in the composition for forming a hard coat layer, an amount of the colloidal silica is 30 to 70% by mass in 100% by mass of the total of the colloidal silica and the resin solid content in the composition for forming a hard coat layer, and the solvent consists of solvents impermeable to the light-transmitting substrate.

The present invention further provides a polarizer, including: a polarizing element, wherein the polarizer includes the optical layered body on a surface of the polarizing element.

The present invention also provides an image display device including the optical layered body or the polarizer on the outermost surface.

Hereinafter, the present invention will be described in detail.

DETAILED DESCRIPTION OF THE INVENTION

The present invention provides an optical layered body, including: a light-transmitting substrate, and a hard coat layer, wherein the light-transmitting substrate is made of triacetyl cellulose, the hard coat layer is a resin layer formed with a composition for forming a hard coat layer containing colloidal silica, a solvent, and pentaerythritol tri(meth)acrylate and/or dipentaerythritol hexa(meth)acrylate, an amount of the pentaerythritol tri(meth)acrylate and/or dipentaerythritol hexa (meth)acrylate is 25% by mass or more in 100% by mass of a resin solid content in the composition for forming a hard coat layer, an amount of the colloidal silica is 30 to 70% by mass in 100% by mass of the total of the colloidal silica and the resin solid content in the composition for forming a hard coat layer, and the solvent consists of solvents impermeable to the light-transmitting substrate.

Accordingly, the optical layered body can avoid an appearance of the interference fringe without a solvent permeable to the light-transmitting substrate (a solvent permeable to a light-transmitting substrate to dissolve or swell the substrate; hereinafter, referred to as "permeable solvent"), and is allowed to have an excellent adhesion property and a high hardness.

Here, in the present description, the permeable solvent refers to a solvent used to form a permeation layer as follows.

A solvent containing pentaerythritol tri(meth)acrylate and/or dipentaerythritol hexa(meth)acrylate as a resin component is used to prepare a resin composition. The resin composition is applied on a triacetylcellulose (TAC) substrate in such a manner that the dried thickness thereof is 7 μm. Here, a permeation layer (a layer in which a resin component and a TAC component are mixed) has a thickness of 3 μm or more when the solid content of the resin composition is 30%, and has a thickness of 1 μm or more when the solid content of the resin composition is 40 to 50%.

The permeable solvent is not particularly limited as long as it forms a permeation layer having a thickness in the above-mentioned range. Examples thereof may include methyl ethyl ketone (MEK), methyl acetate, ethyl acetate, acetone, and methylene chloride.

The optical layered body of the present invention is made to have a slight difference in refractive index between the light-transmitting substrate and the hard coat layer with an aim of avoiding the appearance of an interference fringe without using a permeable solvent. However, even in a case where resin layers having the same refractive index are simply formed, an optical interference is generated on the interface therebetween, so that an interference fringe appears. In the optical layered body of the present invention, a composition containing a predetermined amount of a specific resin, a predetermined amount of colloidal silica and a specific solvent is used to form a hard coat layer having almost the same refractive index as the substrate. As a result, an optical interference does not occur on the interface between the substrate and the hard coat layer, so that damage of the external appearance due to the interference fringe is avoided. The following is presumably a reason for production of such layered body.

When a hard coat layer is formed by curing a composition containing pentaerythritol tri(meth)acrylate and/or dipentaerythritol hexa (meth)acrylate without colloidal silica being added thereto, the crosslink density of the layer varies between the outermost surface and a deep part. As a result, the refractive index presumably varies in the hard coat layer. Accordingly, difference in the refractive index is caused between the hard coat layer and the light-transmitting substrate made of triacetyl cellulose, so that an interference fringe appears.

On the other hand, addition of a predetermined amount of colloidal silica, as in the present invention, slows down the cross-linking reaction of the resin on curing, so that curing reaction progresses slowly. Accordingly, the formed hard coat layer is allowed to have less difference in refractive index inside the layer. As a result, difference in the refractive index is narrowed between the light-transmitting substrate and the hard coat layer, which prevents an appearance of an interference fringe.

Figure 1:
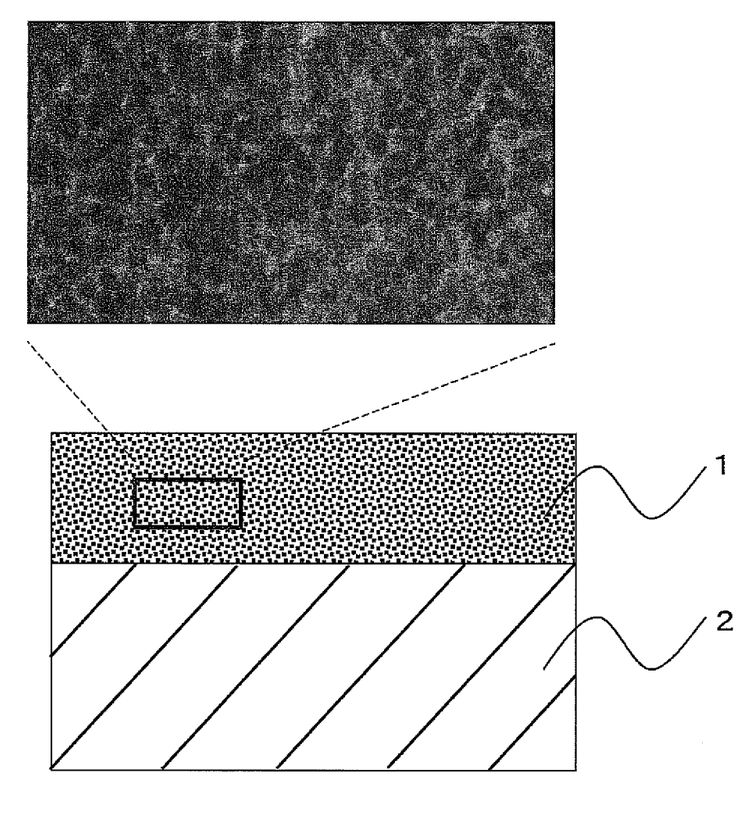
FIG. 1 is an example of a schematic view of a cross section of the optical layered body of the present invention.

FIG. 1 shows an example of a schematic view of a cross section of the optical layered body of the present invention obtained as above and a partially enlarged schematic view thereof. The optical layered body of the present invention can prevent an appearance of an interference fringe, though the interface between a light-transmitting substrate 2 as a lower layer and a hard coat layer 1 containing colloidal silica, which is provided on the substrate, is visually recognized, as shown in FIG. 1.

According to the optical layered body of the present invention, a composition containing a predetermined amount of predetermined components is used to form a hard coat layer. Therefore, it is possible to obtain the optical layered body having a high hardness, and an excellent adhesion property between the substrate and the hard coat layer without using a permeable solvent.

The optical layered body of the present invention has a light-transmitting substrate.

The light-transmitting substrate is made of triacetyl cellulose. The light-transmitting substrate made of triacetyl cellulose is excellent in transparency, smoothness, heat resistance, and mechanical strength.

The thickness of the light-transmitting substrate is desirably 20 to 300 μm, and more desirably 30 to 200 μm. In order to enhance the adhesion property, the light-transmitting substrate may be subjected to physical treatments such as corona discharge treatment and oxidation treatment, or may be coated with a coating composition such as anchoring agents or primers before forming the hard coat layer on the light-transmitting substrate.

The optical layered body of the present invention has a hard coat layer.

The hard coat layer is a resin layer formed with a composition for forming a hard coat layer containing colloidal silica, a solvent, and pentaerythritol tri(meth)acrylate and/or dipentaerythritol hexa(meth)acrylate.

A composition for forming a hard coat layer containing predetermined components is used to form the hard coat layer on a light-transmitting substrate made of the triacetyl cellulose. Accordingly, an interference fringe does not appear on the interface between the hard coat layer and the substrate, and an optical layered body excellent in the hardness and the adhesion property between the substrate and the hard coat layer can be obtained.

The composition for forming a hard coat layer contains pentaerythritol tri(meth)acrylate and/or dipentaerythritol hexa(meth)acrylate. The contained pentaerythritol tri(meth)acrylate and/or dipentaerythritol hexa(meth)acrylate can enhance the adhesion property between the substrate and the hard coat layer even in a case where a solvent impermeable to the light-transmitting substrate is used. Further, the optical layered body is allowed to have a high hardness.

Examples of the pentaerythritol tri(meth)acrylate and dipentaerythritol hexa(meth)acrylate may include modified compounds thereof, such as propyrene oxide(PO)-modified compounds, etyrene oxide (EO)-modified compounds, and caprolactone (CL)-modified compounds. However, it is desirable to use non-modified pentaerythritol tri(meth)acrylate and/or dipentaerythritol hexa(meth)acrylate, as the hardness can be sufficiently enhanced.

The amount of the pentaerythritol tri(meth)acrylate and/or dipentaerythritol hexa (meth)acrylate is 25% by mass or more in 100% by mass of a resin solid content in the composition for forming a hard coat layer. The composition for forming a hard coat layer may contain another binder resin, in addition to the pentaerythritol tri(meth)acrylate and/or dipentaerythritol hexa(meth)acrylate, to the extent that the effect of the present invention is not blocked. In such a case, when the amount of pentaerythritol tri(meth)acrylate and/or dipentaerythritol hexa (meth)acrylate is less than 25% by mass, the adhesion property between the light-transmitting substrate and the hard coat layer is lowered and the desired hardness cannot be achieved. The amount is desirably 60 to 100% by mass in 100% by mass of the resin solid content in the composition for forming a hard coat layer.

The composition for forming a hard coat layer contains colloidal silica.

The contained colloidal silica suitably adjusts the refractive index of the hard coat layer, which prevents an appearance of an interference fringe. Further, the contained colloidal silica can enhance the hardness (pencil hardness) of the optical layered body and improve abrasion resistance. In addition, since a fine surface roughness is formed on the surface of the hard coat layer, it is possible to prevent sticking of optical layered bodies to each other.

The colloidal silica is desirably surface-treated colloidal silica. Examples of the surface-treated colloidal silica include colloidal silica having a ultraviolet reactive functional group on the surface. The ultraviolet reactive functional group is not particularly limited, and examples thereof include acrylate groups, methacrylate groups, and epoxy groups.

Colloidal silica having such a ultraviolet reactive functional group on the surface can be obtained by a method in which a silane coupling agent having the ultraviolet reactive functional group is reacted on the surface of the silica fine particles. The silane coupling agent is not particularly limited and known agent may be used. Examples thereof include KBM-502, KBM-503, KBE-502, and KBE-503 (trade names, each produced by Shin-Etsu Chemical Co., Ltd.).

The average particle size of the colloidal silica is desirably 5 to 200 nm. When the average particle size is less than 5 nm, it is difficult to produce colloidal silica having uniform particle sizes. In addition, agglomeration of particles may become larger. Since the viscosity of coating liquid is increased, coating property may also be damaged. When the average particle size is more than 200 nm, haze is increased and transparency is lowered, which is unfavorable. The average particle size of the colloidal silica is more desirably 10 to 100 nm.

The average particle size can be obtained by observing and measuring a cross section of the optical layered body of the present invention with use of an electron microscope (SEM, TEM, STEM). The average particle size of the colloidal silica dispersed in ink is not different from that of the colloidal silica cured in the hard coat layer.

The colloidal silica is desirably in a spherical particulate shape and/or a non-spherical particulate shape in the composition for forming a hard coat layer.

In the optical layered body of the present invention, colloidal silica in the composition for forming a hard coat layer may be in a spherical particulate shape or a non-spherical particulate shape. However, in order to obtain a to-be-formed hard coat layer having excellent saponification resistance and excellent pencil strength, the colloidal silica is more desirably in a shape of a non-spherical particulate shape.

Here, "non-spherical particulate shape" refers to a shape formed by 3 to 20 pieces of spherical colloidal silica are linked together with an inorganic chemical bind. The above-described surface-treated colloidal silica can be easily formed into such a non-spherical particulate shape.

The colloidal silica in a non-spherical particulate shape is in a state where spherical colloidal silica particles are linked together with an inorganic chemical bind, and therefore, the colloidal silica is tough and less likely to be collapsed when pressed with force from the outside, such as a pencil hardness test. The colloidal silica in a non-spherical particulate shape has a large surface area and advantageously has strong adhesion to the pentaerythritol tri(meth)acrylate and/or dipentaerythritol hexa(meth)acrylate because of its shape. Accordingly, the colloidal silica in a non-spherical particulate shape is less likely to come off and the saponification resistance thereof is enhanced. Further, since the colloidal silica in a non-spherical particulate shape randomly intertwines with others, the colloidal silica is allowed to be physically tough.

Silica in a spherical particulate shape is also tough and less likely to be collapsed when pressed with strong force from the outside, such as a pencil hardness test, provided that the particle size thereof is large (e.g. the average particle size of 30 nm or more). Further, such silica in a spherical particulate shape is less likely to come off and is allowed to have excellent saponification resistance.

Even in a case where the particle sizes of the silica in a spherical particulate shape are small (e.g. the average particle size of less than 30 nm), the hardness around the surface of the hard coat layer is enhanced, and therefore, steel wool resistance of the silica is enhanced.

Examples of the commercial products of the colloidal silica include IPAST, IPASTS, IPASTMS, IPASTL, IPASTZL, IPASTUP, MIBKSTD1, MIBKSTL, and MIBK-STMS (trade names, each produced by NISSAN CHEMICAL INDUSTRIES, LTD.).

The amount of the colloidal silica is 30 to 70% by mass in 100% by mass of the total of the colloidal silica and the resin solid content in the composition for forming a hard coat layer.

As above described, the permeable solvent is not used in the composition for forming a hard coat layer in the present invention. In this case, an interference fringe is likely to appear on the interface between the to-be-formed hard coat layer and the light-transmitting substrate. However, when the amount of the colloidal silica to be added is 30% by mass or more, difference in the refractive index between the to-be-formed hard coat layer and the light-transmitting substrate is narrowed. As a result, an appearance of an interference fringe is suitably prevented on the interface between the light-transmitting substrate and the hard coat layer. In addition, decrease in the hardness of the hard coat layer is also suitably prevented. On the other hand, when the amount of the colloidal silica to be added is more than 70% by mass, the amount of binder resin in the hard coat layer is relatively insufficient, and therefore, the adhesion between the to-be-formed hard coat layer and the light-transmitting substrate may be lowered. The amount of the colloidal silica is desirably 35 to 60% by mass.

The composition for forming a hard coat layer contains a solvent, and the solvent consists of solvents impermeable to the light-transmitting substrate (hereinafter, referred to as "impermeable solvent").

The impermeable solvent does not permeate the light-transmitting substrate to be coated with the composition containing the solvent, and exerts neither wettability nor swelling property. In the present invention, the hard coat layer is formed with the composition for forming a hard coat layer containing the impermeable solvent, colloidal silica, and pentaerythritol tri(meth)acrylate and/or dipentaerythritol hexa (meth)acrylate. As a result, it is possible to avoid an appearance of an interference fringe and enhance the adhesion between the substrate and the hard coat layer, without dissolving or swelling the light-transmitting substrate.

However, even the impermeable solvent is used, there may be a case where a layer is formed, in which the composition containing the impermeable solvent is slightly permeating the light-transmitting substrate (hereinafter, referred to as "Permeation layer"). When the permeation layer is formed, thickness of the permeation layer is desirably 0.70 µm or less in the optical layered body of the present invention. When the thickness is more than 0.70 µm, the pencil hardness may be lowered.

It is to be noted that when the permeable solvent is used, which has been conventionally used in order to prevent an appearance of an interference fringe, the thickness of the permeation layer exceeds 1.0 p.m.

The impermeable solvent is desirably at least one solvent selected from the group consisting of methanol, ethanol, propanol, butanol, propylene glycol monomethyl ether, and methyl isobutyl ketone.

Examples of the propanol include normal propanol, and isopropanol.

Examples of the butanol include normal butanol, sec-butanol, isobutanol, and tert-butanol.

The amount of the impermeable solvent is desirably 50 to 300 parts by mass with respect to the 100 parts by mass of the resin solid content in the composition for forming a hard coat layer. When the amount is less than 50 parts by mass, the viscosity of the resin is increased, which may damages the coating property. When the amount is more than 300 parts by mass, a predetermined thickness cannot be obtained, which may lower the hardness of the layer.

The composition for forming a hard coat layer may contain another component if needed, in addition to colloidal silica, the impermeable solvent, and the pentaerythritol tri(meth) acrylate and/or dipentaerythritol hexa(meth)acrylate, to the extent that the effect of the present invention is not blocked. Examples of another component include photopolymerization initiators, leveling agents, cross linking agents, curing agents, polymerization promoters, viscosity modifiers, antiglare agents, antistatic agents, antifouling agents, other resins, and the like.

Examples of the photopolymerization initiator include acetophenones (e.g. 1-hydroxy-cyclohexyl-phenyl-ketone, commercially available as trade name "Irgacure 184" produced by Ciba Specialty Chemicals Inc., 2-methyl-1[4-(methylthio)phenyl]-2-morpholino propane-1-on commercially available as trade name "Irgacure 907" produced by Ciba Specialty Chemicals Inc.), benzophenones, thioxanthones, benzoin, benzoin methyl ether, aromatic diazonium salts, aromatic sulfonium salts, aromatic iodonium salts, metallocene compounds, benzoin sulfonate, and the like. Each of these may be used alone or two or more of these may be used in combination.

An additive amount of the photopolymerization initiator is desirably 0.1 to 10 parts by mass to 100 parts by mass of the resin solid content.

Known products generally used in the optical layered body may be used as the leveling agent, the cross linking agent, the curing agent, the polymerization promoter, the viscosity modifier, the antiglare agent, the antistatic agent, the antifouling agent, and another resin.

The composition for forming a hard coat layer desirably contains at least one agent selected from the group consisting of antistatic agents, antifouling agents, and antiglare agents. The hard coat layer to be formed with the composition contains at least one agent selected from the group consisting of antistatic agents, antifouling agents, and antiglare agents, and therefore, the hard coat layer is allowed to have antistatic property, antifouling property, or antiglare property.

Various components, as above described, are mixed and dispersed so that the composition for forming a hard coat layer is obtained. Mixing and dispersing may be carried out by using a known method such as a method using a paint shaker and a method using a bead mill.

The hard coat layer is a resin layer formed with the composition for forming a hard coat layer.

The hard coat layer is desirably formed by following the procedures of applying the composition for forming a hard coat layer on the light-transmitting substrate to form a coat, and curing the coat, after drying the coat if needed, by irradiation with active energy beams.

Methods for applying the composition for forming a hard coat layer include a roll coating method, a Mayer bar coating method, a gravure coating method, and the like.

The irradiation with active energy beams includes irradiation with ultraviolet rays or electron beams. Specific examples of an ultraviolet source include light source such as ultra-high pressure mercury lamps, high-pressure mercury lamps, low-pressure mercury lamps, carbon-arc lamps, black light fluorescent lamps, and metal-halide lamps. As wavelength of the ultraviolet, a wave range of 190 to 380 nm is acceptable. Specific examples of an electron beam source include various kinds of electron beam accelerators such as Cockcroft-Walton type, van de Graaff type, resonance transformer type, insulator core transformer type, linear type, dynamitron type, and high frequency type.

A thickness of the hard coat layer is desirably 0.05 to 30 µm. If the thickness is less than 0.05 µm, not only coating irregularity is developed to make the appearance of a coat bad, but also the hardness of the layer may not be developed. Further, if the thickness is more than 30 µm, not only cracks are produced in the film itself or film winding becomes difficult, but also production cost becomes high. Further, this case is at risk of increasing haze and deteriorating light transmittance. The thickness is more desirably 0.1 to 20 µm, and further desirably 2 to 20 µm. If the thickness of the hard coat layer is less than 2 µm, the pencil hardness may be lowered. On the other hand, if the thickness of the hard coat layer is more than 20 µm, water vapor permeation rate of the hard coat layer tends to be lowered. In a case where the water vapor permeation rate of the hard coat layer is lowered, when a polarizer is obtained by jointing the bottom face of the light-transmitting substrate and the polarizing element with use of an adhesive, there may be caused a problem that it is difficult to remove the solvent (water, an organic solvent, and the like) contained in the adhesive. If the thickness is more than 20 µm, a curl and a crack are likely to appear in the layer, which is unfavorable. It also causes higher cost. In addition, if the thickness is more than 20 µm, a UV ray is less likely to reach the deep portion of the hard coat layer at UV curing, which causes insufficient curing of the deep portion of the hard coat layer. As a result, the formed hard coat layer may have the lower adhesion property.

The thickness is obtained by observing and measuring a cross-section of the layer with an electron microscope (SEM, TEM, or STEM).

The hardness of the optical layered body is desirably class "2H" or higher in scratch hardness test by a pencil method (load 4.9 N) of JIS K 5600-5-4 (1999). A layer of this kind can enhance properties such as the hardness and the abrasion resistance of the optical layered body.

In the optical layered body of the present invention, the refractive index of the hard coat layer and the refractive index of the light-transmitting substrate show quite similar values. Accordingly, it is possible to inhibit optical interference on the interface and an appearance of an interference fringe. As above described, a hard coat layer is formed with the above-described specific components on the light transmitting substrate made of triacetyl cellulose so that such an optical layered body is obtained. Here, when a difference between the refractive index of the light-transmitting substrate and the refractive index of the hard coat layer is 0.02 or less, that refers to a state where the refractive index of the hard coat layer and the refractive index of the light-transmitting substrate show quite similar values.

The optical layered body of the present invention has the light-transmitting substrate and the hard coat layer, and it may include at least one layer selected from the group consisting of an antistatic layer, a low refractive index layer, an antiglare layer, a high refractive index layer, a medium refractive index layer, an antifouling layer, a second hard coat layer of the same type as the hard coat layer, and another hard coat layer of a type different from the hard coat layer as an optional layer if needed.

A low refractive index agent, an antistatic agent, an antiglare agent, a high refractive index agent, a medium refractive index agent, an antifouling agent, a resin, and the like, which are known and usually used, may be added to prepare compositions. With these compositions, the antistatic layer, the low refractive index layer, the antiglare layer, the high refractive index layer, the medium refractive index layer, and the antifouling layer may be respectively formed by a publicly known method. The second hard coat layer may be formed on the upper face of the above hard coat layer or on the antistatic layer and the like provided on the above hard coat layer, by the same method as for the above-described hard coat layer. Further, as another hard coat layer as above described, a hard coat layer used in the conventionally-known optical layered body may be formed on the upper face of the above hard coat layer or on the antistatic layer and the like provided on the above hard coat layers by a known method.

Examples of the specific layer structure of the optical layered body of the present invention include structures respectively having on the hard coat layer: another hard coat layer; a high refractive index layer and a low refractive index layer; a low refractive index layer; an antistatic layer and a low refractive index layer; and an antifouling layer.

The optical layered body of the present invention desirably has total light transmittance of 90% or higher. When the total light transmittance is lower than 90%, color reproducibility and visibility may be reduced when it is provided on the display surface. The total light transmittance is more desirably 95% or higher and further desirably 98% or higher.

The total light transmittance is measured in conformity to JIS K-7361 using a haze meter (produced by Murakami Color Research Laboratory Co., Ltd., trade no.; HM-150).

The haze of the optical layered body of the present invention is desirably less than 1%, and more desirably less than 0.5%.

In a case where the optical layered body of the present invention has an antiglare layer, the haze may be less than 80% as a whole layered body. The haze of the antiglare layer may include a haze by internal diffusion and a haze by surface roughness on the outermost surface. The haze by internal diffusion is desirably 3.0 to 79% (including 3.0 and not including 79), and more desirably 10 to 50% (including 10 and not including 50). The haze of the outermost surface is desirably 1 to 35% (including 1 and not including 35), more desirably 1 to 20% (including 1 and not including 20), and further desirably 1 to 10% (including 1 and not including 10).

The haze is measured by a method in conformity to JIS K-7136 using a haze meter (produced by Murakami Color Research Laboratory Co., Ltd., trade no.; HM-150).

The hardness of the optical layered body of the present invention is desirably class 2H or higher in scratch hardness test by a pencil method (load 4.9 N) of JIS K 5600-5-4 (1999), more desirably class 3H or higher, and furthermore desirably class 4H or higher. A smaller abrasion loss of a test piece caused in a T bar test according to JIS K 5400 is preferable.

A method of producing the optical layered body of the present invention includes the step of applying a composition for forming a hard coat layer on a light-transmitting substrate so as to form a hard coat layer. The light-transmitting substrate is made of triacetyl cellulose. The composition for forming a hard coat layer contains colloidal silica, a solvent, pentaerythritol tri(meth)acrylate and/or dipentaerythritol hexa(meth)acrylate. The amount of the pentaerythritol tri (meth)acrylate and/or dipentaerythritol hexa (meth)acrylate is 25% by mass or more in 100% by mass of a resin solid content in the composition for forming a hard coat layer. The amount of the colloidal silica is 30 to 70% by mass in 100% by mass of the total of the colloidal silica and the resin solid content in the composition for forming a hard coat layer. The solvent consists of solvents impermeable to the light-transmitting substrate. Accordingly it is possible to produce an optical layered body, which has a high hardness and a fine external appearance without an interference fringe, and is excellent in the adhesion property between a substrate and a hard coat layer, without using the above-described permeable solvent.

As a method for forming the hard coat layer, the same method as the method for forming a hard coat layer by using the above-described composition for forming a hard coat layer may be used.

Such a method of producing the optical layered body also constitutes the present invention.

The optical layered body of the present invention is provided on a polarizing element with a surface thereof contacting the side opposite to the side where the hard coat layer in the optical layered body is present, so that a polarizer is obtained. Such a polarizer also constitutes the present invention.

The polarizing element is not particularly limited, and examples thereof include polyvinyl alcohol films, polyvinyl formal films, polyvinyl acetal films, and ethylene-vinyl acetate copolymer saponified films, which are dyed with iodine or the like and stretched. In the laminating treatment of the polarizing element and the optical layered body of the present invention, a saponification treatment is desirably performed on the light-transmitting substrate (triacetyl cellulose film). The fine adhesive property between the polarizing element and the optical layered body and an antistatic effect can be achieved by the saponification treatment.

The present invention also provides an image display device including the optical layered body or the polarizer on the outermost surface. The image display device may be a non-self-luminous image display device such as LCD, or may be a self-luminous image display device such as PDP, FED, ELD (organic EL, inorganic EL) and CRT.

The LCD, which is a typical example of the non-self-luminous image display device, includes a light-transmitting display and a light source device to irradiate the light-transmitting display from the backside. When the image display device of the present invention provides an LCD, the image display device includes the optical layered body of the present invention or the polarizer of the present invention on the surface of this light-transmitting display.

When the present invention provides a liquid crystal display device having the optical layered body, a light source of the light source device irradiates the optical layered body from the bottom side thereof. In addition, in a STN type liquid crystal display device, a retardation plate may be inserted between a liquid crystal display element and the polarizer. An adhesive layer may be provided between the respective layers of this liquid crystal display device if needed.

The PDP, which is the self-luminous image display device, includes a surface glass substrate (electrodes are formed on the surface) and a backside glass substrate (electrodes and fine grooves are formed on the surface and the groove has red, green, or blue phosphor layer therein) that is located at a position opposite to the surface glass substrate with an electric discharge gas filled between these substrates. When the image display device of the present invention is a PDP, the PDP has the optical layered body described above on the surface of the surface glass substrate or on a front plate (glass substrate or film substrate) thereof.

The self-luminous image display device may be an ELD apparatus in which luminous substances of zinc sulfide or diamines capable of emitting light with the application of a voltage are deposited on a glass substrate and display is performed by controlling a voltage to be applied to the substrate. The self-luminous image display device may also be an image display device such as CRT, which converts electric signals to light to generate visible images. In this case, the image display device is provided with the optical layered body described above on the outermost surface of each of the display devices or on the surface of a front plate thereof.

In any case, the optical layered body of the present invention can be used for displays of televisions, computers, word processors, and the like. Particularly, it can be suitably used for the surfaces of high-resolution image displays, such as CRTs, liquid crystal panels, PDPs, ELDs and FEDs.

Effect of the Invention

Since the optical layered body of the present invention has a constitution described above, it has a fine external appearance without an interference fringe, and is excellent in the adhesion property and hardness. Therefore, the optical layered body of the present invention can be suitably applied to cathode ray tube (CRT) display devices, liquid crystal displays (LCD), plasma displays (PDP), electroluminescence displays (ELD), and field emission displays (FED).

EXPLANATION OF THE NUMERAL SYMBOLS 1 hard coat layer
2 light-transmitting substrate

BEST MODE FOR CARRYING OUT THE INVENTION

The present invention will be described by way of the below examples, but the present invention is not to be construed to limit to these embodiments. Words of "part(s)" and "%" refer to "part (s) by mass" and "% by mass", unless otherwise specified.

Compositions 1 to 31 for forming a hard coat layer were prepared based on the composition shown in Production Examples 1 to 31.

Production Example 1

Composition 1 for Forming a Hard Coat Layer

Surface-treated silica fine particles (produced by NISSAN CHEMICAL INDUSTRIES, LTD.; IPAST, average particle size 12 nm, colloidal silica)
    50 parts by mass (solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Normal butanol
    70 parts by mass Production Example 2

Composition 2 for Forming a Hard Coat Layer

Surface-treated silica fine particles (produced by NISSAN CHEMICAL INDUSTRIES, LTD.; IPAST, average particle size 12 nm, colloidal silica)
    70 parts by mass (solid equivalent)
Pentaerythritol triacrylate (produced by Nippon Kayaku Co., Ltd.; PET 30)
    10-30 parts by mass
Irgacure 184 (produced by Ciba Specialty Chemicals)
    4 parts by mass
Normal butanol
    70 parts by mass Production Example 3

Composition 3 for Forming a Hard Coat Layer

Surface-treated silica fine particles (produced by NISSAN CHEMICAL INDUSTRIES, LTD.; IPAST, average particle size 12 nm, colloidal silica)
    50 parts by mass (solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Isopropyl alcohol (IPA)
    70 parts by mass Production Example 4

Composition 4 for Forming a Hard Coat Layer

Surface-treated silica fine particles (produced by NISSAN CHEMICAL INDUSTRIES, LTD.; IPAST, average particle size 12 nm, colloidal silica)
    50 parts by mass (solid equivalent)
Pentaerythritol triacrylate (produced by Nippon Kayaku Co., Ltd.; PET 30)
    40 parts by mass
Trimethylolpropane triacrylate (produced by Nippon Kayaku Co., Ltd.; TMPTA)
    10 parts by mass
Irgacure 184 (produced by Ciba Specialty Chemicals)
    4 parts by mass
Normal butanol
    70 parts by mass Production Example 5

Composition 5 for Forming a Hard Coat Layer

Surface-treated silica fine particles (produced by NISSAN CHEMICAL INDUSTRIES, LTD.; IPASTMS, average particle size 20 nm, colloidal silica)
  50 parts by mass (solid equivalent)
Pentaerythritol triacrylate (produced by Nippon Kayaku Co., Ltd.; PET 30)
  50 parts by mass
Irgacure 184 (produced by Ciba Specialty Chemicals)
  4 parts by mass
Normal butanol
  70 parts by mass Production Example 6

Composition 6 for Forming a Hard Coat Layer

Surface-treated silica fine particles (produced by NISSAN CHEMICAL INDUSTRIES, LTD.; IPAST (L), average particle size 40 nm, colloidal silica)
  50 parts by mass (solid equivalent)
Pentaerythritol triacrylate (produced by Nippon Kayaku CO., Ltd.; PET 30)
  50 parts by mass
Irgacure 184 (produced by Ciba Specialty Chemicals)
  4 parts by mass
Normal butanol
  70 parts by mass Production Example 7

Composition 7 for Forming a Hard Coat Layer

Surface-treated silica fine particles (produced by ARAKAWA CHEMICAL INDUSTRIES, LTD.; BS906, colloidal silica content 40%, average particle size 50 nm)
  100 parts by mass (solid equivalent)
Pentaerythritol triacrylate (produced by Nippon Kayaku Co., Ltd.; PET 30)
  25 parts by mass
Irgacure 184 (produced by Ciba Specialty Chemicals)
  4 parts by mass
IPA
  100 parts by mass Production Example 8

Composition 8 for Forming a Hard Coat Layer

Surface-treated silica fine particles (produced by Momentive Performance Materials Inc.; XR39-C3796, colloidal silica (average particle size 20 nm) content 70% and pentaerythritol triacrylate content 30% in the solid content)
  100 parts by mass (solid equivalent)
Irgacure 184 (produced by Ciba. Specialty Chemicals)
  4 parts by mass
IPA
  100 parts by mass Production Example 9

Composition 9 for Forming a Hard Coat Layer

Surface-treated silica fine particles (produced by NISSAN CHEMICAL INDUSTRIES, LTD.; MIBK-SDL, average particle size 44 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
  166 parts by mass (50 parts by mass in solid equivalent)
Pentaerythritol triacrylate (produced by Nippon Kayaku Co., Ltd.; PET 30)
  50 parts by mass
Irgacure 184 (produced by Ciba Specialty Chemicals)
  4 parts by mass
Normal butanol
  34 parts by mass Production Example 10

Composition 10 for Forming a Hard Coat Layer

Surface-treated silica fine particles (produced by NISSAN CHEMICAL INDUSTRIES, LTD.; MIBK-SDZL, average particle size 80 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
  166 parts by mass (50 parts by mass in solid equivalent)
Pentaerythritol triacrylate (produced by Nippon Kayaku Co., Ltd.; PET 30)
  50 parts by mass
Irgacure 184 (produced by Ciba Specialty Chemicals)
  4 parts by mass
Normal butanol
  34 parts by mass Production Example 11

Composition 11 for Forming a Hard Coat Layer

Surface-treated silica fine particles (produced by NISSAN CHEMICAL INDUSTRIES, LTD.; MIBK-ST, average particle size 12 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
  166 parts by mass (50 parts by mass in solid equivalent)
Pentaerythritol triacrylate (produced by Nippon Kayaku Co., Ltd.; PET 30)
  50 parts by mass
Irgacure 184 (produced by Ciba Specialty Chemicals)
  4 parts by mass
Normal butanol
  34 parts by mass Production Example 12

Composition 12 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
  125 parts by mass (50 parts by mass in solid equivalent)
Pentaerythritol triacrylate (produced by Nippon Kayaku Co., Ltd.; PET 30)
  50 parts by mass
Irgacure 184 (produced by Ciba Specialty Chemicals)
  4 parts by mass
Normal butanol
  25 parts by mass

Production Example 13

Composition 13 for Forming a Hard Coat Layer

Surface-treated silica fine particles (produced by NISSAN CHEMICAL INDUSTRIES, LTD.; MIBK-SDUP, average primary particle size 7 nm, average connectivity number 4, average secondary particle size 25 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    166 parts by mass (50 parts by mass in solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Normal butanol
    4 parts by mass

Production Example 14

Composition 14 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    63 parts by mass (25 parts by mass in solid equivalent)
Surface-treated silica fine particles (produced by NISSAN CHEMICAL INDUSTRIES, LTD.; MIBK-ST, average particle size 12 nm, solid content 30%, colloidal silica, solvent; MIBK, surface treating agent; methacrylic silane coupling agent (3-methacryloxypropyltrimethoxysilane, KBM-503 produced by Shin-Etsu Chemical Co., Ltd.))
    83 parts by mass (25 parts by mass in solid equivalent)
Pentaerythritol triacrylate (produced by Nippon Kayaku Co., Ltd.; PET 30)
    50 parts by mass
Irgacure 184 (produced by Ciba Specialty Chemicals)
    54 parts by mass
Normal butanol
    4 parts by mass

Production Example 15

Composition 15 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    150 parts by mass (60 parts by mass in solid equivalent)
Pentaerythritol triacrylate (produced by Nippon Kayaku Co., Ltd.; PET 30)
    40 parts by mass
Irgacure 184 (produced by Ciba Specialty Chemicals)
    4 parts by mass
Normal butanol
    60 parts by mass

Production Example 16

Composition 16 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    88 parts by mass (35 parts by mass in solid equivalent)
Pentaerythritol triacrylate (produced by Nippon Kayaku Co., Ltd.; PET 30)
    65 parts by mass
Irgacure 184 (produced by Ciba Specialty Chemicals)
    4 parts by mass
Normal butanol
    97 parts by mass

Production Example 17

Composition 17 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 5.5 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    125 parts by mass (50 parts by mass in solid equivalent)
Dipentaerythritol hexaacrylate (produced by Nippon Kayaku Co., Ltd.; DPHA)
    50 parts by mass
Irgacure 184 (produced by Ciba Specialty Chemicals)
    4 parts by mass
Normal butanol
    25 parts by mass

Production Example 18

Composition 18 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    125 parts by mass (50 parts by mass in solid equivalent)
Dipentaerythritol hexaacrylate (produced by Nippon Kayaku Co., Ltd.; DPHA)
    25 parts by mass
Pentaerythritol triacrylate (produced by Nippon Kayaku Co., Ltd.; PET 30)
    25 parts by mass
Irgacure 184 (produced by Ciba Specialty Chemicals)
    4 parts by mass
Normal butanol
    25 parts by mass

Production Example 19

Composition 19 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    125 parts by mass (50 parts by mass in solid equivalent)
Dipentaerythritol hexaacrylate (produced by Nippon Kayaku Co., Ltd.; DPHA)
    40 parts by mass
Polymer acrylate (produced by ARAKAWA CHEMICAL INDUSTRIES, LTD., BEAMSET DK 1, solid content 75%, MIBK solvent)
    13 parts by mass (10 parts by mass in solid equivalent)
Irgacure 184 (produced by Ciba Specialty Chemicals)
    4 parts by mass
Methyl isobutyl ketone (MIBK)
    25 parts by mass

Production Example 20

Composition 20 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    125 parts by mass (50 parts by mass in solid equivalent)
Dipentaerythritol hexaacrylate (produced by Nippon Kayaku Co., Ltd.; DPHA)
    40 parts by mass
Urethane acrylate (produced by The Nippon Synthetic Chemical Industry Co., Ltd., UV1700B)
    10 parts by mass
Irgacure 184 (produced by Ciba Specialty Chemicals)
    4 parts by mass
Methyl isobutyl ketone (MIBK)
    25 parts by mass

Production Example 21

Composition 21 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane: KBM-503 produced by Shin-Etsu Chemical. Co., Ltd.))
    125 parts by mass (50 parts by mass in solid equivalent)
Dipentaerythritol hexaacrylate (produced by Nippon Kayaku Co., Ltd.; DPHA)
    40 parts by mass
Trimethylolpropane (produced by Nippon Kayaku Co., Ltd., TMPTA)
    10 parts by mass
Irgacure 184 (produced by Ciba Specialty Chemicals)
    4 parts by mass
Methyl isobutyl ketone (MIBK)
    25 parts by mass

Production Example 22

Composition 22 for Forming a Hard Coat Layer

Surface-treated silica fine particles (produced by NISSAN CHEMICAL INDUSTRIES, LTD.; MIBK-SDL2, average particle size 44 nm, solid content 30%, colloidal silica, solvent; MIBK, surface treating agent; acrylic silane coupling agent (3-acryloxypropyltrimethoxysilane: KBM-5103 produced by Shin-Etsu Chemical Co., Ltd.))
    166 parts by mass (50 parts by mass in solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Normal butanol
    34 parts by mass

Production Example 23

Composition 23 for Forming a Hard Coat Layer

Surface-treated silica fine particles (produced by NISSAN CHEMICAL INDUSTRIES, LTD.; MIBK-SDL, average particle size 44 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    166 parts by mass (50 parts by mass in solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Methyl isobutyl ketone (MIBK)
    34 parts by mass

Production Example 24

Composition 24 for Forming a Hard Coat Layer

Surface-treated silica fine particles (produced by NISSAN CHEMICAL INDUSTRIES, LTD.; MIBK-SDL, average particle size 44 nm, solid content 30%, colloidal silica, solvent; MIBK, surface treating agent; methacrylic silane coupling agent (3-methacryloxypropyltrimethoxysilane: KBM-503 produced by Shin-Etsu Chemical Co., Ltd.))
    166 parts by mass (50 parts by mass in solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Propylene glycol monomethyl ether (PGME)
    34 parts by mass

Production Example 25

Composition 25 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane, KBM-503 produced by Shin-Etsu Chemical Co., Ltd.))
    100 parts by mass (40 parts by mass in solid equivalent)
Dipentaerythritol hexaacrylate (produced by Nippon Kayaku Co., Ltd.; DPHA)
    50 parts by mass
Polymer acrylate (produced by ARAKAWA CHEMICAL INDUSTRIES, LTD., BEAMSET DK 1, solid content 75%, MIBK solvent)
    13 parts by mass (10 parts by mass in solid equivalent)
Irgacure 184 (produced by Ciba Specialty Chemicals)
    4 parts by mass
Methyl isobutyl ketone (MIBK)
    37 parts by mass
Antifouling agent (produced by DIC Corporation, MEGFAC RS71)
    0.6 parts by mass in solid equivalent Production Example 26

Composition 26 for Forming a Hard Coat Layer

Surface-treated silica fine particles (produced by NISSAN CHEMICAL INDUSTRIES, LTD.; IPAST, average particle size 12 nm, colloidal silica)
    5 parts by mass (solid equivalent)
Pentaerythritol triacrylate (produced by Nippon Kayaku Co., Ltd.; PET 30)
    95 parts by mass
Irgacure 184 (produced by Ciba Specialty Chemicals)
    4 parts by mass
Normal butanol
    70 parts by mass Production Example 27

Composition 27 for Forming a Hard Coat Layer

Surface-treated silica fine particles (produced by NISSAN CHEMICAL INDUSTRIES, LTD.; IPAST, average particle size 12 nm, colloidal silica)
    95 parts by mass (solid equivalent)
Pentaerythritol triacrylate (produced by Nippon Kayaku Co., Ltd.; PET 30)
    5 parts by mass
Irgacure 184 (produced by Ciba Specialty Chemicals)
    4 parts by mass
Normal butanol
    70 parts by mass Production Example 28

Composition 28 for Forming a Hard Coat Layer

Surface-treated silica fine particles (produced by NISSAN CHEMICAL INDUSTRIES, LTD.; IPAST, average particle size 12 nm, colloidal silica)
    50 parts by mass (solid equivalent)
Pentaerythritol triacrylate (produced by Nippon Kayaku Co., Ltd.; PET 30)
    50 parts by mass
Irgacure 184 (produced by Ciba Specialty Chemicals)
    4 parts by mass
Methyl ethyl ketone
    70 parts by mass Production Example 29

Composition 29 for Forming a Hard Coat Layer

Surface-treated silica fine particles (produced by NISSAN CHEMICAL INDUSTRIES, LTD.; IPAST, average particle size 12 nm, colloidal silica)
    50 parts by mass (solid equivalent)
Urethane acrylate (produced by The Nippon Synthetic Chemical Industry Co., Ltd.; UV6300B)
    49 parts by mass
Pentaerythritol triacrylate (produced by Nippon Kayaku Co., Ltd.; PET 30)
    1 part by mass
Irgacure 184 (produced by Ciba Specialty Chemicals)
    4 parts by mass
Normal butanol
    70 parts by mass Production Example 30

Composition 30 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane, KBM-503 produced by Shin-Etsu Chemical Co., Ltd.))
    63 parts by mass (25 parts by mass in solid equivalent)
Pentaerythritol triacrylate (produced by Nippon Kayaku Co., Ltd.; PET 30)
    75 parts by mass
Irgacure 184 (produced by Ciba Specialty Chemicals)
    4 parts by mass
Normal butanol
    112 parts by mass Production Example 31

Composition 31 for Forming a Hard Coat Layer

Surface-treated silica fine particles (produced by JGC Catalysts and Chemicals Ltd., trade name DP1039SIV; average primary particle size 20 nm, average connectivity number 3.5, average secondary particle size 55 nm, solid content 40%, colloidal silica, solvent; MIBK, surface treating agent; methacrylic silane coupling agent (3-methacryloxypropyltrimethoxysilane, KBM-503 produced by Shin-Etsu Chemical Co., Ltd.))
    188 parts by mass (75 parts by mass in solid equivalent)
Pentaerythritol triacrylate (produced by Nippon Kayaku Co., Ltd.; PET 30)
    25 parts by, mass
Irgacure 184 (produced by Ciba Specialty Chemicals)
    4 parts by mass
Normal butanol
    37 parts by mass

EXAMPLES

Example 1

Production of Optical Layered Body

A transparent substrate (a triacetyl cellulose resin film having a thickness of 80 μm; produced by FUJIFILM Corp., TF80UL) was prepared, and the composition 1 for forming a hard coat layer was applied to one face of the film and dried at 70° C. in an oven for 60 seconds so that the solvent was removed. Then, ultraviolet-light irradiation was carried out at the exposure dose of 200 mJ/cm² to cure the composition, so that a hard coat layer of 15 g/cm² (on a dry basis) was formed. Accordingly, an optical layered body having a light-transmitting substrate and a hard coat layer was obtained.

Examples 2 to 25

Comparative Examples 1 to 6

An optical layered body was produced in each of Examples 2 to 25 and Comparative Examples 1 to 6 by the same Method as that in Example 1, except for using each of compositions 2 to 31 for forming a hard coat layer in place of the composition 1 for forming a hard coat layer.

Optical layered bodies obtained in Examples and Comparative Examples were evaluated by the following methods. Tables 1 (Table 1-1 and Table 1-2) show the results.

(Evaluation 1: Pencil Hardness)
Hardness in the pencil scratch test was evaluated as follows: humidity conditioning was carried out on the produced hard coat films (the above optical layered bodies) at a temperature of 25° C. and at a relative humidity of 60% for two hours; and the pencil hardness test was carried out under a load of 4.9 N with a test pencil (hardness: 4H) defined in JIS-S-6006, in conformity to a method for evaluating pencil hardness defined in JIS K 5600-5-4 (1999).

(Evaluation 2: Steel Wool Resistance)
The produced hard coat films (the above optical layered bodies) were respectively rubbed back and forth 10 times at various friction loads using steel wool of #0000. After that, presence of a scratch and a detachment of the coat was visually observed and evaluation was made under the below criteria.
Excellent: no scratch and no detachment of the coat observed at a friction load of 1000 g/cm²
Good: no scratch and no detachment of the coat observed at a friction load of 700 g/cm² (a scratch or a detachment of the coat observed at 1000 g/cm²).
Poor: a scratch or a detachment of the coat observed at a friction load of 700 g/cm²

(Evaluation 3: Adhesion Property)
The adhesion property was evaluated by a cross-cut adhesion test. The original number (100) of cut portions and the number of cut portions remaining on the substrate after peeling off the adhesive tape were compared and evaluation was made under the below criteria.
Good: 95/100 to 100/100
Average: 50/100 to 94/100
Poor: less than 50/100

(Evaluation 4: Presence of Interference Fringe)
A black tape for preventing back reflection was attached to the face opposite to the hard coat layer of the optical layered body, and the optical layered body was visually observed from the hard-coat-layer face, so that presence of an interference fringe was visually evaluated under the following criteria.
Good: no interference fringe observed
Poor: interference fringe observed (Evaluation 5: Haze)
A haze value (%) was measured in conformity to JIS K-7136 using a haze meter (produced by Murakami Color Research Laboratory Co., Ltd., trade no.; HM-150), and evaluated under the below criteria.
Good: 1.0% or less
Poor: more than 1.0%

(Evaluation 6: Total Light Transmittance)
The total light transmittance was measured in conformity to JIS K-7361 using a haze meter (produced by Murakami Color Research Laboratory Co., Ltd., trade no.; HM-150), and evaluated under the below criteria.
Good: 90% or more
Poor: less than 90%

(Evaluation 7: Saponification Resistance)
The produced hard coat films (the above optical layered bodies) were respectively immersed in saponification solution (2N sodium hydroxide aqueous solution) kept at a temperature of 55° C. for two minutes. Then, the hard coat films were sufficiently washed with water and dried at a temperature of 70° C. for five minutes. Here, the steel wool resistance test of Evaluation 2 was carried out and evaluation was made under the below criteria.
Good: No scratch and no detachment observed
Poor: A scratch or a detachment observed

TABLE 1-1

| | | Colloidal silica | | | | Binder resin | | |
|---|---|---|---|---|---|---|---|---|
| Examples | Composition for forming hard coat layer | Shape | Average particle diameter *1 (nm) | Reactive functional group | Content *2 (% by mass) | Compound | Content (Parts by mass) | Percentage of PETA and/or DPHA *3 (% by mass) |
| 1 | 1 | Spherical particulates | 12 | Absent | 50 | PETA | 50 | 100 |
| 2 | 2 | Spherical particulates | 12 | Absent | 70 | PETA | 30 | 100 |
| 3 | 3 | Spherical particulates | 12 | Absent | 50 | PETA | 50 | 100 |
| 4 | 4 | Spherical particulates | 12 | Absent | 50 | PETA/TMPTA | 40/10 | 80 |
| 5 | 5 | Spherical particulates | 20 | Absent | 50 | PETA | 50 | 100 |
| 6 | 6 | Spherical particulates | 40 | Absent | 50 | PETA | 50 | 100 |
| 7 | 7 | Spherical particulates | 50 | Present | 50 | PETA | 50 | 100 |
| 8 | 8 | Spherical particulates | 20 | Present | 70 | PETA | 30 | 100 |
| 9 | 9 | Spherical particulates | 44 | Present | 50 | PETA | 50 | 100 |
| 10 | 10 | Spherical particulates | 80 | Present | 50 | PETA | 50 | 100 |
| 11 | 11 | Spherical particulates | 12 | Present | 50 | PETA | 50 | 100 |
| 12 | 12 | Non-spherical particulates | 55 | Present | 50 | PETA | 50 | 100 |
| 13 | 13 | Non-spherical particulates | 25 | Present | 50 | PETA | 50 | 100 |

TABLE 1-1-continued

| | Composition for forming hard coat layer | Shape | Average particle diameter *1 (nm) | Reactive functional group | Content *2 (% by mass) | Compound | Content (Parts by mass) | Percentage of PETA and/or DPHA *3 (% by mass) |
|---|---|---|---|---|---|---|---|---|
| 14 | 14 | spherical/non-spherical particulates | 55/12 | Present | 25/25 | PETA | 50 | 100 |
| 15 | 15 | Non-spherical particulates | 55 | Present | 60 | PETA | 40 | 100 |
| 16 | 16 | Non-spherical particulates | 55 | Present | 35 | PETA | 65 | 100 |
| 17 | 17 | Non-spherical particulates | 55 | Present | 50 | DPHA | 50 | 100 |
| 18 | 18 | Non-spherical particulates | 55 | Present | 50 | PETA/DPHA | 25/25 | 100 |
| 19 | 19 | Non-spherical particulates | 55 | Present | 50 | PETA/Polymer | 40/10 | 80 |
| 20 | 20 | Non-spherical particulates | 55 | Present | 50 | PETA/Urethane | 40/10 | 80 |
| 21 | 21 | Non-spherical particulates | 55 | Present | 50 | PETA/TMPTA | 40/10 | 80 |
| 22 | 22 | Spherical particulates | 44 | Present | 50 | PETA | 50 | 100 |
| 23 | 23 | Spherical particulates | 44 | Present | 50 | PETA | 50 | 100 |
| 24 | 24 | Spherical particulates | 44 | Present | 50 | PETA | 50 | 100 |
| 25 | 25 | Non-spherical particulates | 55 | Present | 40 | DPHA/Polymer | 50/10 | 80 |

| Examples | Pencil hardness | Steel wool resistance | Adhesion property | Interference fringe | Haze | Total light transmittance | Saponification resistance |
|---|---|---|---|---|---|---|---|
| 1 | 4H | Good | Good | Good | Good | Good | Good |
| 2 | 4H | Good | Good | Good | Good | Good | Good |
| 3 | 4H | Good | Good | Good | Good | Good | Good |
| 4 | 4H | Good | Good | Good | Good | Good | Good |
| 5 | 4H | Good | Good | Good | Good | Good | Good |
| 6 | 4H | Good | Good | Good | Good | Good | Good |
| 7 | 5H | Excellent | Good | Good | Good | Good | Excellent |
| 8 | 5H | Excellent | Good | Good | Good | Good | Good |
| 9 | 5H | Excellent | Good | Good | Good | Good | Excellent |
| 10 | 5H | Excellent | Good | Good | Good | Good | Excellent |
| 11 | 5H | Excellent | Good | Good | Good | Good | Excellent |
| 12 | 6H | Excellent | Good | Good | Good | Good | Excellent |
| 13 | 6H | Excellent | Good | Good | Good | Good | Excellent |
| 14 | 5H | Excellent | Good | Good | Good | Good | Excellent |
| 15 | 6H | Excellent | Good | Good | Good | Good | Excellent |
| 16 | 5H | Excellent | Good | Good | Good | Good | Excellent |
| 17 | 6H | Excellent | Good | Good | Good | Good | Excellent |
| 18 | 6H | Excellent | Good | Good | Good | Good | Excellent |
| 19 | 5H | Good | Good | Good | Good | Good | Excellent |
| 20 | 5H | Good | Good | Good | Good | Good | Excellent |
| 21 | 5H | Good | Good | Good | Good | Good | Excellent |
| 22 | 5H | Excellent | Good | Good | Good | Good | Excellent |
| 23 | 5H | Excellent | Good | Good | Good | Good | Excellent |
| 24 | 5H | Excellent | Good | Good | Good | Good | Excellent |
| 25 | 5H | Excellent | Good | Good | Good | Good | Excellent |

*1: Average secondary particle diameter in the case of non-spherical particulate shape
*2: Content in 100% by mass of the total of colloidal silica and binder resin
*3: Content of PETA and/or DPHA in 100% by mass of the resin solid content in the composition for forming a hard coat layer

TABLE 1-2

| Comparative Examples | Composition for forming hard coat layer | Shape | Average particle diameter *1 (nm) | Reactive functional group | Content *2 (% by mass) | Compound | Content (Parts by mass) | Percentage of PETA and/or DPHA *3 (% by mass) |
|---|---|---|---|---|---|---|---|---|
| 1 | 26 | Spherical particulates | 12 | Absent | 5 | PETA | 95 | 100 |
| 2 | 27 | Spherical particulates | 12 | Absent | 95 | PETA | 5 | 100 |
| 3 | 28 | Spherical particulates | 12 | Absent | 50 | PETA | 50 | 100 |
| 4 | 29 | Spherical particulates | 12 | Absent | 50 | PETA/Urethane | 1/49 | 0.02 |
| 5 | 30 | Non-spherical particulates | 55 | Present | 25 | PETA | 75 | 100 |
| 6 | 31 | Non-spherical particulates | 55 | Present | 75 | PETA | 25 | 100 |

| Comparative Examples | Pencil hardness | Steel wool resistance | Adhesion property | Interference fringe | Haze | Total light transmittance | Saponification resistance |
|---|---|---|---|---|---|---|---|
| 1 | 3H | Good | Good | Poor | Poor | Poor | Good |
| 2 | 3H | Poor | Average | Poor | Poor | Poor | Poor |
| 3 | 2H | Good | Good | Poor | Good | Good | Poor |
| 4 | 3H | Good | Poor | Good | Good | Good | Poor |

TABLE 1-2-continued

| | | | | | | | |
|---|---|---|---|---|---|---|---|
| 5 | 2H | Good | Good | Poor | Good | Good | Good |
| 6 | 3H | Good | Poor | Good | Poor | Poor | Poor |

*1: Average secondary particle diameter in the case of non-spherical particulate shape
*2: Content in 100% by mass of the total of colloidal silica and binder resin
*3: Content of PETA and/or DPHA in 100% by mass of the resin solid content in the composition for forming a hard coat layer As shown in Tables 1, no interference fringe appeared in any of the optical layered bodies of Examples, and those optical layered bodies were excellent in all of optical properties, hardness, and an adhesion property between the substrate and the hard coat layer. On the other hand, none of the optical layered bodies of Comparative Examples was excellent in all features.

INDUSTRIAL APPLICABILITY

The optical layered body of the present invention can be suitably applied to a cathode-ray tube (CRT) display device, a liquid crystal display (LCD), a plasma display (PDP), an electroluminescence display (ELD), a field emission display (FED), and the like.

The invention claimed is:

1. An optical layered body, comprising:
a light-transmitting substrate; and a hard coat layer,
wherein said light-transmitting substrate is made of triacetyl cellulose,
said hard coat layer is a resin layer formed with a composition for forming a hard coat layer containing colloidal silica, a solvent, and pentaerythritol tri(meth)acrylate and/or dipentaerythritol hexa(meth)acrylate,
the colloidal silica is in a non-spherical particulate shape or in a spherical particulate shape and a non-spherical particulate shape, wherein the non-spherical particulate shape is a shape formed by 3 to 20 pieces of spherical colloidal silica that are linked together with an inorganic chemical bond,
an amount of said pentaerythritol tri(meth)acrylate and/or dipentaerythritol hexa(meth)acrylate is 60 to 100% by mass in 100% by mass of a resin solid content in said composition for forming a hard coat layer,
an amount of said colloidal silica is 30 to 70% by mass in 100% by mass of the total of said colloidal silica and the resin solid content in said composition for forming a hard coat layer,
said solvent consists of solvents impermeable to said light-transmitting substrate and
the thickness of said hard coat layer is 2 to 20 μm.

2. The optical layered body according to claim 1, wherein the amount of the colloidal silica is 35 to 60% by mass in 100% by mass of the total of the colloidal silica and the resin solid content in the composition for forming a hard coat layer.

3. The optical layered body according to claim 1, wherein the solvent impermeable to the light-transmitting substrate is at least one solvent selected from the group consisting of methanol, ethanol, propanol, butanol, propylene glycol monomethyl ether, and methyl isobutyl ketone.

4. A polarizer, comprising:
a polarizing element,
wherein said polarizer includes the optical layered body according to claim 1, on a surface of the polarizing element.

5. An image display device, comprising:
the optical layered body according to claim 1, on the outermost surface.

6. The optical layered body according to claim 1, wherein a permeation layer is formed in the light-transmitting substrate, and wherein the permeation layer has a thickness of 0.70 μm or less.

7. The optical layered body according to claim 1, wherein the hard coat layer further comprises at least one agent selected from the group consisting of an antistatic agent, an antifouling agent, and an antiglare agent.

8. The optical layered body according to claim 1, wherein the colloidal silica is surface-treated.

9. The optical layered body according to claim 8, wherein the colloidal silica is surface-treated with an ultraviolet reactive functional group.

10. A method of producing an optical layered body comprising the step of
applying a composition for forming a hard coat layer on a light-transmitting substrate so as to form a hard coat layer,
wherein said light-transmitting substrate is made of triacetyl cellulose,
said composition for forming a hard coat layer contains colloidal silica, a solvent, and pentaerythritol tri(meth)acrylate and/or dipentaerythritol hexa(meth)acrylate,
the colloidal silica is in a non-spherical particulate shape or in a spherical particulate shape and a non-spherical particulate shape, wherein the non-spherical particulate shape is a shape formed by 3 to 20 pieces of spherical colloidal silica that are linked together with an inorganic chemical bond,
an amount of said pentaerythritol tri(meth)acrylate and/or dipentaerythritol hexa(meth)acrylate is 60 to 100% by mass in 100% by mass of a resin solid content in said composition for forming a hard coat layer,
an amount of said colloidal silica is 30 to 70% by mass in 100% by mass of the total of said colloidal silica and the resin solid content in said composition for forming a hard coat layer,
said solvent consists of solvents impermeable to said light-transmitting substrate
and
the thickness of said hard coat layer is 2 to 20 μm.

* * * * *